United States Patent [19]

Vonnegut

[11] Patent Number: 4,671,108

[45] Date of Patent: Jun. 9, 1987

[54] OSCILLATORY ANEMOMETER

[75] Inventor: Bernard Vonnegut, Albany, N.Y.

[73] Assignee: The Research Foundation of State University of New York, Albany, N.Y.

[21] Appl. No.: 786,615

[22] Filed: Oct. 11, 1985

[51] Int. Cl.[4] .............................................. G01W 1/04
[52] U.S. Cl. ................................... 73/189; 73/861.21
[58] Field of Search ................. 73/189, 861.18, 861.21

[56] References Cited

U.S. PATENT DOCUMENTS

2,061,189  11/1936  Dungan ................................... 73/189
2,809,520  10/1957  Richard, Jr. ........................... 73/189
3,273,389   9/1966  Waugh .

Primary Examiner—Charles A. Ruehl
Attorney, Agent, or Firm—Heslin & Rothenberg

[57] ABSTRACT

An oscillatory anemometer for simultaneously indicating wind speed and direction employs a main member free to rotate under the influence of aerodynamic forces about a first axis and a fin mounted near the downwind end of the main member for pivotal movement about a parallel axis betwen two stable positions. The fin swings between the stable positions forcing the main member through inertial overshoot into oscillation about a mean alignment with the wind direction. The frequency of main member oscillation is linearly proportional to wind speed.

20 Claims, 11 Drawing Figures

OSCILLATORY ANEMOMETER

GOVERNMENT RIGHTS STATEMENT

This invention was made with government support under contract number N00014-80-C-0312 awarded by the U.S. Navy. The government has certain rights in this invention.

BACKGROUND OF THE INVENTION

1. Technical Field

This invention relates generally to the field of fluid flow measurement and especially to instruments for measuring and indicating the direction and speed of the wind.

2. Background Information

Wind measurements have been made for many years for numerous applications. Typically two separate instruments have been used to measure wind direction and wind speed. The relatively simple weather vane is commonly used to indicate wind direction while more complex devices such as a cup anemometer are employed to measure wind speed.

Some instruments, such as the propeller anemometer, have previously been developed to indicate both wind speed and direction. However, such instruments, generally exhibit a relatively slow response time, are complicated to fabricate, and are not readily adaptable to either provide a discernable visual indication of wind velocity or to measure very high wind speeds.

Heretofore, a single, simple instrument capable of simultaneously measuring both variable wind speed and variable direction, over an extended range, with high sensitivity, and in a predictable, accurate fashion has been unavailable. Further an anemometer which indicates direction as well as wind speed and operates, through inertial overshoot, in an oscillatory mode, at a frequency which is linearly proportional to wind speed has not been known.

U.S. Pat. No. 3,273,389 to C. C. Waugh describes an oscillating vane flow meter. However, this device is limited to measuring the rate of unidirectional flow of a fluid in a conduit, is of complex construction and requires an upstream vane or fin to induce oscillation.

A need thus persists for an instrument that is capable of measuring both the speed and direction of an unrestricted fluid flow, which is simple in design, easy to manufacture, linear over a large operating range, readily scaled up or down in size, and particularly well suited for anemometry.

SUMMARY OF THE INVENTION

This need is satisfied in accordance with the present invention by the provision of an instrument capable of simultaneously indicating the direction and speed of an unrestricted or variable-in-direction fluid flow while at the same time being simpler to construct and operate than many of the prior art devices. (For purposes of this application, the term "unrestricted" refers to a fluid flow originating from any quarter or direction while "variable-in-direction" connotes fluid flow which can originate from any one of a plurality of different directions.) Although applicable to the flow of various fluids, the instrument of the present invention is especially well suited to measure wind speed and direction and will hereinafter be described primarily in this meteorological context.

The inventor has discovered that it is possible by a relatively simple modification to change the behavior of a wind vane so that it can be used to indicate wind speed as well as wind direction. Generally speaking, this is accomplished by mounting the normally fixed fin on the downwind portion of the vane so that its windward edge is free to pivot back and forth through a fixed angle relative to the main member of the vane. Under the action of the wind, with this arrangement, the fin jibes back and forth forcing the main member to oscillate about the direction of the wind with a frequency that the inventor has determined is linearly proportional to wind speed.

To the best of the inventor's knowledge this is the first known application of such an oscillatory technique to meteorological instrumentation for measuring wind. Based upon its mode of operation, the new instrument is sometimes hereinafter referred to as an oscillatory anemometer.

More particularly, the oscillatory anemometer of the present invention includes a main member free to rotate about a first axis. The first axis extends orthogonally through said main member. A fin is mounted on the main member near its downwind end in such a manner that it can pivot, relative to said main member about a second axis. The second axis is substantially parallel to the first axis. Limit means are also mounted on the main member for limiting the pivotal movement of the fin about the second axis and for defining two stable positions for said fin at extremes of said limited pivotal movement.

In operation, wind pressure on the fin forces the fin into one of said stable positions and produces a torque which causes the main member to rotate about the first axis until the fin is aligned with the wind direction and the main member is in a position in which it experiences no lift. (In this discussion, the term "lift" indicates the aerodynamic force acting to cause rotation either of the fin or of the main member; for small angles, this force is virtually identical with the aerodynamic lift, as strictly defined.) The size of the fin and the composite moment of inertia of the main member, fin, fin mounting means and limit means are such as to cause the main member to experience inertial overshoot and travel beyond this no lift position whereupon wind pressure forces the fin to pivot about the second axis into the other of said stable positions. This produces a lift which causes the main member to rotate in a reverse direction about the first axis until the main member once more reaches a position in which it experiences no lift, overshoots, reverses rotational direction and the process repeats itself. The main member is thus made to oscillate about the first axis. The mean position of the oscillating main member provides an indication of wind direction and the frequency of main member oscillation provides an indication of wind speed. The frequency of main member oscillation is directly, linearly proportional to wind speed in accordance with a derived relationship described more fully hereinafter.

Preferably, the main member is free to rotate about the assembly's primary axis, under the influence of aerodynamic forces, through an angle which both encompasses the possible directions of a variable-in-direction wind and allows main member inertial overshoot and oscillation about any of said possible directions, and the limit means limits movement of the fin to a total angle no greater than approximately thirty degrees.

A wind measuring instrument constructed in accordance with the principles of the present invention provides numerous advantages and benefits. The oscillatory anemometer measures both variable wind speed and variable direction simultaneously with the same apparatus thereby combining functions that, in the past, were often performed using two separate instruments. Yet this is accomplished with a structure that is easier to construct, simpler to calibrate, more straight forward to use, and less expensive than many prior art anemometers.

The invention is extremely versatile, can be scaled up or down in size as desired, can be made extremely light weight, and is capable of a wide variety of applications. The oscillatory anemometer can be readily fabricated in sizes ranging from about a centimeter to many meters in length. Models weighing on the order of one gram or less are possible. Very small instruments are capable of operating at high wind speeds which suggests their usefulness as air speed and attitude indicators on aircraft. On the other hand, the units can be made so large that they will be visible from long distances so that if placed on an airport they would inform the pilot not only of the wind direction but also of the wind speed. Other important features of the oscillatory anemometer are its high sensitivity, rapid and predictable response to changes in wind speed, its linearity of response, and its design flexibility.

The oscillatory anemometer possesses advantages over the mechanical anemometers that are currently used in its speed of response. The response time of the oscillatory anemometer is accurately known, for it is very simply one-half the period of oscillation and is therefore inversely proportional to the wind speed. By contrast, rotating instruments, such as the cup anemometer and the propeller anemometer, exhibit considerable time lag between the actual wind speed and the indicated wind speed. When the wind suddenly increases, these devices require some time before they come up to speed and provide an accurate indication. When the wind suddenly decreases or even drops to zero, these prior art devices continue to rotate and indicate a wind even when the wind may have completely ceased.

The oscillatory anemometer is simple in its construction compared to other anemometers, employing only two bearings, a main member, which can be either a piece of wood, plastic, or metal, a fin, which can readily be made of flat sheet metal, plywood or plastic, and simple fin movement limit means. The simplicity of this design allows the oscillatory anemometer to be easily fabricated in sizes ranging from ones as small as a centimeter or less to those as large as 4 or 5 meters. In contrast, the rotating anemometers require the complicated fabrication of a propeller with blades of a complicated aerodynamic shape or specially fabricated cups that must be attached to the arms radiating from a hub attached to a shaft. Rotating anemometers require careful balancing, which is not necessary in the oscillatory anemometer.

It is also not readily possible to construct rotating anemometers whose speed of rotation can be used to give a visual indication of wind speed, for the speed of rotation of the cups or of the propeller is far too rapid to be estimated by eye. On the other hand, by increasing the moment of inertia of the oscillatory anemometer or by decreasing the area of the fin, it is possible to construct a device whose speed of oscillation is as low as a few oscillations per minute and can readily be observed at some distance by eye, thus permitting direct visual observation of wind speed.

A further advantage of the oscillatory anemometer is that it is better suited for miniaturization and for the measurement of high wind speeds, such as might be encountered in severe storms or in the operation of an aircraft. For example, at a wind speed of the order of 100 meters per second an oscillatory anemometer a centimeter or so in size vibrates back and forth at a rate of approximately 50 Hz. By contrast, if a cup anemometer or a propeller anemometer could be reduced to this size, it would be rotating at speeds of the order of 50,000 rpm. To design a rotating instrument capable of operating at speeds even much lower than this is a demanding art requiring careful balancing to minimize vibration, careful design to avoid structural failure under large centrifugal forces, and bearings capable of operating at extremely high rotational speeds.

BRIEF DESCRIPTION OF THE DRAWINGS

These and other features and advantages of the present invention, will be more fully understood from the following detailed description when read in conjunction with the accompanying drawings in which.

DETAILED DESCRIPTION

Figure 1:
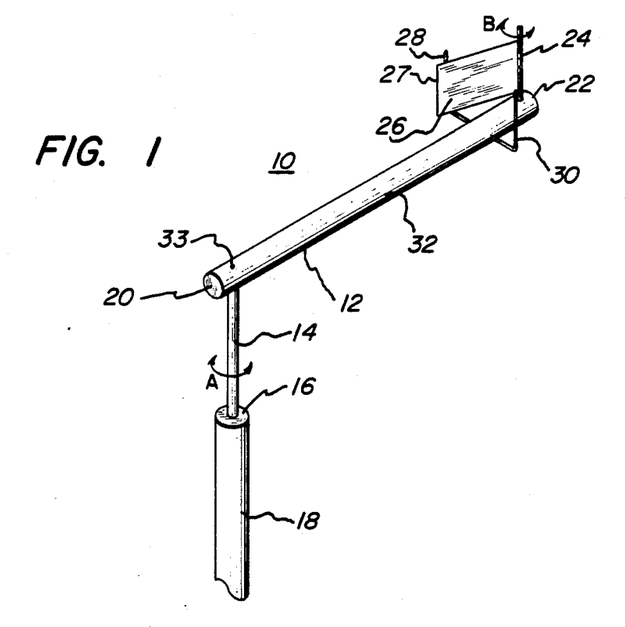
FIG. 1 is an isometric view of one embodiment of the oscillatory anemometer of the present invention.

FIG. 1 illustrates a preferred embodiment of the oscillatory anemometer of the present invention suitable for providing a simultaneous indication of the direction and speed of a horizontal component of the wind. This wind component can vary both in its velocity and in the direction from which it originates. The oscillatory anemometer or assembly, generally denoted by reference number 10, includes a main member 12 mounted atop vertically oriented shaft 14. The lower end of shaft 14 is journaled within a main bearing 16 near the top of a mast 18 or other suitable support. Shaft 14 and attached main member 12 are free to rotate to any angular position, in a clockwise or counter-clockwise direction, as dictated by the wind and indicated by double-headed arrow A in FIG. 1. This unrestricted rotation occurs about a first vertical axis which is coincident with shaft 14 and orthogonally intersects main member 12 at a pivot point 33.

One end 20 of main member 12 is considered an upwind end while the other end 22 defines a downwind end of the main member. Mounted near this downwind end is a vertically oriented fin bearing member 24. A trailing or leeward edge of fin 26 is supported by bearing member 24 so that the fin may freely rotate in response to the wind about a second vertical axis as indicated by double-headed arrow B. Although illustrated as a flat, thin rectangular plate, fin 26 may assume other contours and configurations.

The pivotal movement of the forward or windward edge 27 of fin 26 is limited by detents 28 and 30 secured to main member 12 and extending on either side of fin 26. The detents determine the fin angle, which is the maximum angle through which the fin is free to move on either side of main member 12 and also define two stable positions for the fin at the extremes of its limited pivotal movement. Preferably this fin angle is less than about 15 degrees.

It is important to note that in accordance with the teachings of this invention only one fin need be mounted on the main member in sharp contrast with the structure described in the previously mentioned Waugh patent. In FIG. 1, this fin 26 and the associated bearing member 24 and limit means 28 and 30 are all shown supported on the downwind portion 32 of the main member. The downwind portion 32 extends from downwind end 22 to pivot point 33. As more fully discussed hereinafter, the main member may also be provided with an upwind portion extending substantially beyond pivot point 33 for purposes of balance and preventing bias. Under some circumstances, the windward edge of fin 26 may extend beyond pivot point 33 and the limit means may be mounted on an upwind portion of the main member.

Figures 2A, 2B:
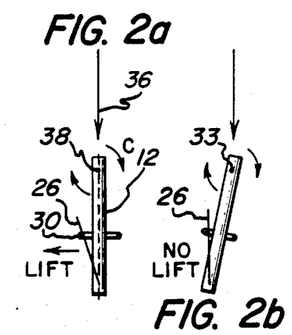
FIGS. 2a–2f are simplified plan views illustrating the oscillatory mode of operation of the present invention.

The operation of the oscillatory anemometer of FIG. 1 will now be described with reference to FIGS. 2a–2f. In FIG. 2a, main member 12 is shown with its longitudinal axis 38 aligned with the current wind direction 36. In this main member position, the only stable positions of the fin are at the detents. If fin 26 rests against detent 30, the fin makes an angle to the wind and therefore experiences a lift. As illustrated in FIG. 2a, this lift has a horizontal component perpendicular to main member 12 and the resultant torque causes the main member to rotate about the first vertical axis in a direction indicated by arrow C.

As the main member's excursion angle, (i.e. the angle formed between the longitudinal axis 38 of main member 12 and wind direction 36), increases, the lift decreases. When the excursion angle has become equal to the value of the fin angle, the fin is aligned with the wind and the lift vanishes, as indicated in FIG. 2b.

Figures 2C, 2D:
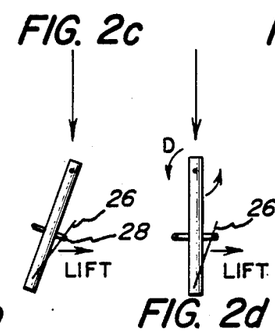
Figures 2E, 2F:
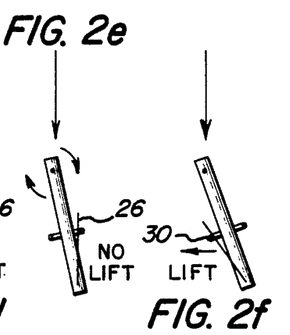

The main member, however, experiences inertial overshoot and travels beyond this position of zero lift because of its angular momentum, as more fully explained hereinafter. The overshoot generates lift in the other direction, which swings the fin over to the other side, i.e. to its only other stable position wherein fin 26 leans against detent 28, as shown in FIG. 2c. The lift force now produces a restoring torque in the opposite direction causing the main member to rotate in a reverse direction D about the first axis, as depicted in FIG. 2d. This reverse rotation continues until the main member once more overshoots a no-lift position (FIG. 2e) the fin swings over to its other stable position (FIG. 2f), and the direction of main member rotation reverses. This process repeats itself and the main member is thus made to oscillate about a mean alignment with the wind direction.

The forces producing main member overshoot and the significance of the rotational freedom of the main member will now be described. If the sum of the torques resulting from bearing friction and aerodynamic forces acting on components of the anemometer assembly other than the fin are too large, the angular momentum acquired by the device as the result of the torque produced by wind acting on the fin will not be sufficient to rotate the main member past the angle at which the wind force acting on the fin goes through zero. Under this condition, the aerodynamic torques acting on the fin cannot overcome the frictional and drag torques, and the apparatus ceases to oscillate. To overcome this problem, the anemometer is designed so that in its operating range the area of the fin and the moment of inertia of the assembly are such that the kinetic energy imparted to the assembly by the wind acting on the fin exceeds the energy that will be required to overcome friction and aerodynamic forces on the assembly as it is accelerated from one excursion extreme to the angle at which the fin is parallel to the wind and the aerodynamic lift is zero. This technique for causing the assembly to move through the position of zero lift is referred to herein as inertial overshoot.

Even though at zero angle of attack no wind force is acting on the fin, the assembly does not stop at this point, but continues to rotate past the angle of zero lift because of the assembly's angular momentum. When this happens the torque resulting from the force of the wind rotates the fin to the other side, applying a reverse torque to the assembly, causing it to slow down to a stop and accelerate in the opposite direction thus continuing the oscillation process. The assembly is constructed and situated such that the main member's angular movement is unlimited in either direction of rotation through an angle which not only encompasses the possible directions of the variable-in-direction wind but also allows main member inertial overshoot and oscillation about any of the possible directions. The characteristics of the bearings, the moment of inertia of the assembly, and the size of the fin can be so chosen that in the operating range of the instrument the assembly overshoots well beyond the zero angle of attack, thus changing the direction of the wind torque acting on the fin and causing the fin to rotate to the detent on the opposite side.

The freedom of the main member to rotate under the influence of aerodynamic forces, in either direction about the principle axis, either without any restriction or at least unimpeded through an angle which both encompasses the possible directions of a variable-in-direction wind and allows inertial overshoot and oscillation about any of the possible directions, is important not only to its ability to indicate wind direction and to oscillate under the influence of the wind, but also to the linear relationship that has experimentally been found to exist between wind speed and frequency and that also is predicted by theory. The equations describing the oscillatory anemometer's motion presented hereinafter suggest that limits imposed on the angular motion of the assembly about its principal rotational axis would impose large additional non-linear torques that would destroy the desirable linear response that is observed when the assembly is allowed to rotate freely and overshoot in either direction, as described.

The frequency of main member oscillation provides an indication of wind speed. In fact the inventor has determined and confirmed experimentally that the frequency of the oscillatory anemometer's oscillation is linearly proportional to wind speed. The derivation of expressions describing the oscillatory anemometer's motion will now be presented.

Figure 3:
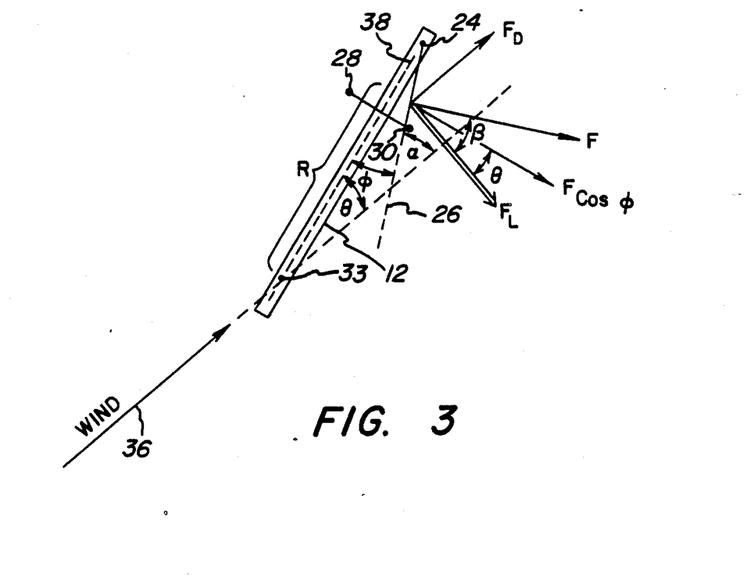
FIG. 3 is a schematic illustration useful in understanding the theory of operation of the present invention.

FIG. 3 illustrates an arbitrary position of main member 12 relative to wind direction 36. In this figure and the ensuing discussion, $\theta$ represents the main member's excursion angle (i.e. the angle between the main member's longitudinal axis 38 and wind direction 36), $\phi$ represents fin angle (i.e. the angle between fin 26 and longitudinal axis 38 when the fin rests against one of the detents), $\alpha$ represents the fin's angle of attack (i.e. the angle between fin 26 in one of its stable positions and wind direction 36), $F_L$ represents the lift force, $F_D$ represents drag force, F represents the resultant of $F_L$ and $F_D$, F Cos $\phi$ represents the force component that gives rise to the restoring torque, and R is the distance from the pivot point 33 to the aerodynamic center of fin 26.

Ignoring all damping effects, the restoring torque (Y) of the oscillation may be expressed as $$Y = F \cos(\beta - \theta) R \quad (1)$$

where R is the distance from the pivot point 33 of the main member to the aerodynamic center of the fin (which according to prior work is at approximately a quarter chord distance from the fin's leading edge), $\theta$ is the main member's excursion angle, $\beta$ may be seen from the geometry to be in general $$\beta = \tan^{-1}\left|\frac{F_D}{F_L}\right| \quad (2)$$

where $F_D$ and $F_L$ are the drag and lift forces, respectively, experienced by the fin, and finally, F may be expressed in terms of lift as $$F = \frac{F_L}{\cos(\beta)} \quad (3)$$

Substituting (2) and (3) into (1) yields a general torque equation:

$$Y = F_L R \frac{\cos\left(\tan^{-1}\left|\frac{F_D}{F_L}\right| - \theta\right)}{\cos\left(\tan^{-1}\left|\frac{F_D}{F_L}\right|\right)} \quad (4)$$

In general the torque must thus be determined for each excursion angle from experimentally obtained values of lift and drag for corresponding angles of attack. But, for a flat fin at least, a reasonable assumption is that the resultant force, F, acts in a direction perpendicular to the fin's surface. Then $\beta$ becomes equal to $\alpha$, the angle of attack, which is the sum of the fin angle, $\phi$, and the excursion angle, $\theta$, and $$\tau = F_L R \frac{\cos(\phi)}{\cos(\alpha)} \quad (5)$$

In accordance with aerofoil theory, $$F_L = 0.5 \rho V^2 S a \sin(\alpha) \quad (6)$$

where $\rho$ is the air density, V is the wind speed, S is the fin area and a, the slope of the lift curve, having the theoretical value of $2\pi$ for aerofoils of infinite span, but for aerofoils of small aspect (span to chord) ration ( A.R.<2) is well approximated by $\pi$A.R./2.

The torque for a flat fin is then $$Y = 0.5 \rho V^2 S R a \cos\phi \tan\alpha \quad (7)$$

Assuming now only small angles of attack, tan ($\alpha$)$\cong \alpha = \theta + \phi$ and Cos ($\phi$)$\cong$1. Then $$Y \cong 0.5 \rho V^2 S R a (\theta + \phi) \quad (8)$$

The equilibrium condition for an anemometer with moment of inertia, I, is then $$I \frac{d^2\theta}{dt^2} = -0.5 \rho V^2 S R a (\theta + \phi) \quad (9)$$

which, since the fin angle, $\phi$ is constant, is just a description of simple harmonic motion with frequency $$f = \left[\frac{0.5 \rho S R a}{I}\right]^{\frac{1}{2}} \frac{V}{2\pi} \quad (10)$$

The frequency of the anemometer's oscillation is thus a linear function of the wind speed, but depends otherwise on its moment of inertia, the fin area and the distance between the pivot point of the main member and the aerodynamic center of the fin. Additionally, the above analysis suggests that fin shape should affect the frequency of main member oscillation through "a".

Experiments with prototype oscillatory anemometers confirm that equation (10) provides a useful description of the motion of this instrument. These experiments have confirmed the linear relationship between the frequency of oscillation and wind speed, the square root dependence on fin area, and the square root dependence on moment of inertia (the latter, to within 10%). However, the experimental data does indicate some surprising departures from aerofoil theory in that the frequency of oscillation appears to be totally independent of fin shape and for small fin angles the oscillating fin appears to behave almost as an aerofoil of infinite length.

The reason for these discrepancies may lie in neglect of what is going on when the fin jibes between the detents. A considerable impulse is rendered each time the fin hits the detents making the flip-overs audible. These impulses are ignored in the above theoretical derivation.

The differences between experiment and theory suggest that "a", instead of representing the slope of the lift curve should be interpreted as a torque parameter, in accordance with prior analyses of ordinary wind vanes, and correspondingly should be replaced by the effective torque parameter a , in equation (10). This parameter may be considered to contain all angle of attack effects, including stall and the effects of the flip-over impulse described earlier. The expression for the frequency of oscillation thus becomes:

$$f = \left[\frac{0.5 \rho S R a_{ve}}{I}\right]^{\frac{1}{2}} \frac{V}{2\pi} \quad (11)$$

The response time, $T_r$, of the oscillatory anemometer may be defined as half the period of its oscillation. Since $T_r$ is thus $\frac{1}{2}f$, we have from equation (11):

$$T_r = \frac{\pi}{V}\left[\frac{I}{0.5\rho RSa_{ve}}\right]^{\frac{1}{2}} \quad (12)$$

Accordingly, the response time is inversely proportional to the wind speed for a given design.

Threshold wind speed, $V_t$, may be expressed as $$V_t = 2\pi A\left[\frac{I}{0.5\rho RSa_{ve}}\right]^{\frac{1}{2}} \quad (13)$$

where A must be determined experimentally for any particular construction but is a constant. Since both the response time and the threshold wind speed are influenced by design parameters, the oscillatory anemometer may be tailored to meet performance requirements dictated by its intended application.

To test the theory underlying the oscillatory anemometer, several instruments were made of different materials in different sizes. Specifications on two that were primarily used in these tests are shown below. The fins were flat, rectangular plates made of 0.5 mm thick aluminum sheets.

| Anemometer | R (cm) | I (Kg-m²) | Main Member Material |
|---|---|---|---|
| A | 26.0 | 90 × 10⁻⁵ | Wood |
| B | 7.0 | 13 × 10⁻⁵ | Copper |

Miniature models were also made and tested in the laboratory. Their length was 2-4 cm, the fin areas 0.5-1.0 cm², and their weight only about 1 gram. For test purposes, these models were run in a venturi tube of 2.5 cm diameter, where wind speeds up to 95 ms⁻¹ could be attained.

Figure 4:
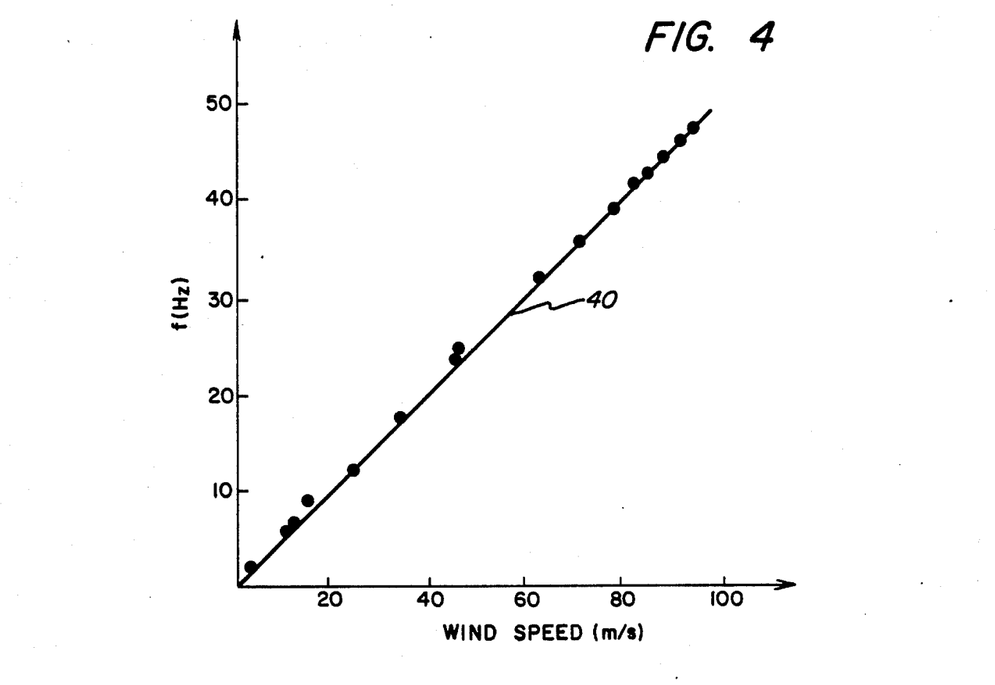
FIG. 4 is a graphical depiction of the frequency of oscillation of a miniature version of the oscillatory anemometer plotted against wind speed.

Data on one of these miniature models are shown in FIG. 4. Its threshold wind speed was 3.5 ms⁻¹, and its response was linear throughout the entire range of about 90 ms⁻¹.

For the miniature models the thresholds were generally found to be rather high, but they could be lowered by decreasing their weight. Thresholds as low as 1 ms⁻¹ were observed, but these anemometers could not withstand winds greater than about 10 ms⁻¹.

Having scaled the oscillatory anemometer down to a few centimeters in size, it was considered of interest to also scale it up an order of magnitude or so. A 3.6 m long main member with a fin of 0.3 m² on it was mounted on a vertical roller bearing. This model was compared with a cup anemometer. Although the observations were limited to a narrow range of wind speeds, around 5 ms⁻¹, the following conclusions may be from its operation: in steady wind it oscillated as regularly as the smaller ones did, only at a lower frequency ($f = 2.1 \times 10^{-2} V$); it had a threshold as low as the cup anemometer ($\sim 1$ ms⁻¹); small scale turbulence caused by nearby obstructions to the wind sometimes causes its big fin to flutter and thus disturb its oscillation.

These scaling experiments demonstrate that the oscillatory anemometer of the present invention can be readily fabricated in sizes ranging from only a centimeter or so to many meters in length. The very small instruments can be designed with a high speed of response and may be useful as air speed and attitude indicators on aircraft, where wind direction varies over a relatively narrow angle. Larger instruments that would be visible from long distances can be used at airports to provide indications of wind speed and direction to incoming pilots. In instruments of larger size, the fin can be made to make a significant sound as it flips back and forth providing a good measure of wind speed to people within earshot of the device.

Figure 5:
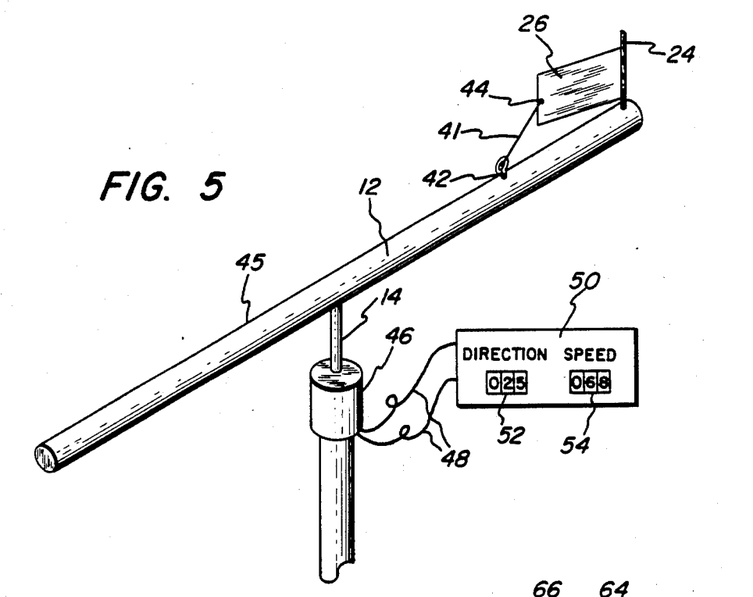
FIG. 5 is an isometric view of another embodiment of the oscillatory anemometer of the present invention.

FIG. 5 illustrates another version of the oscillatory anemometer of the present invention. This embodiment employs a tether 41, e.g. a rope or chain, to limit the pivotal movement of fin 26. One end 42 of tether 41 is secured to the downwind portion of main member 12 while the other end 44 is secured to the windward end of fin 26. Tether 41 serves the same purpose as the detents of FIG. 1, i.e. to limit pivotal movement of the fin and define two stable positions at the extremes of this limited pivotal movement.

Main member 12, in FIG. 5, is shown with an extended upwind portion 45. In the case of a larger size anemometer in which gravitational forces acting on the assembly approach or become greater than the aerodynamic forces acting upon it, it may become desirable to design the assembly so that its center of gravity coincides with the main rotation axis. Similarly, in some circumstances it may be desirable to arrange the fin so that its center of gravity coincides with its rotation axis. It should be recognized, however, that in such a design it is necessary to provide structures having mass that will extend up wind some distance from the axis of rotation of the main member or downwind of the axis of rotation of the fin. The aerodynamic forces acting on a structure extending upwind of the main axis will result in torques that will add or subtract to the torques produced by the fin. If they become large they can interfere with the behavior of the device. It is therefore desirable to avoid interference of such torques with the behavior of the anemometer by designing it so that the cross section of these structures presented to the wind as well as that of the main member and detents be kept to a minimum consistent with their having adequate strength.

FIG. 5 also depicts pick-up means 46 which may be mounted on shaft 14 to detect, in any known fashion, the frequency of oscillation of the main member and its mean alignment. Signals from pick-up 46 are conveyed, for example, by electric cables 48, to an indicator 50. These signals may be processed, as appropriate, to provide display outputs 52 and 54 corresponding respectively to current wind direction and wind speed. Pick-up mechanism 46 may be a mechanical switching assembly, optical arrangement, electrical commutator structure or the like, capable of detecting and providing output signals indicative of the frequency of oscillation of the main member and its mean alignment. Similarly, indicator device 50 may be any of various known visual, audible or other type indicating and display apparatus. The communication link between the pick-up mechanism and the indicating device may be via cable, radio wave, etc.

Figure 6:
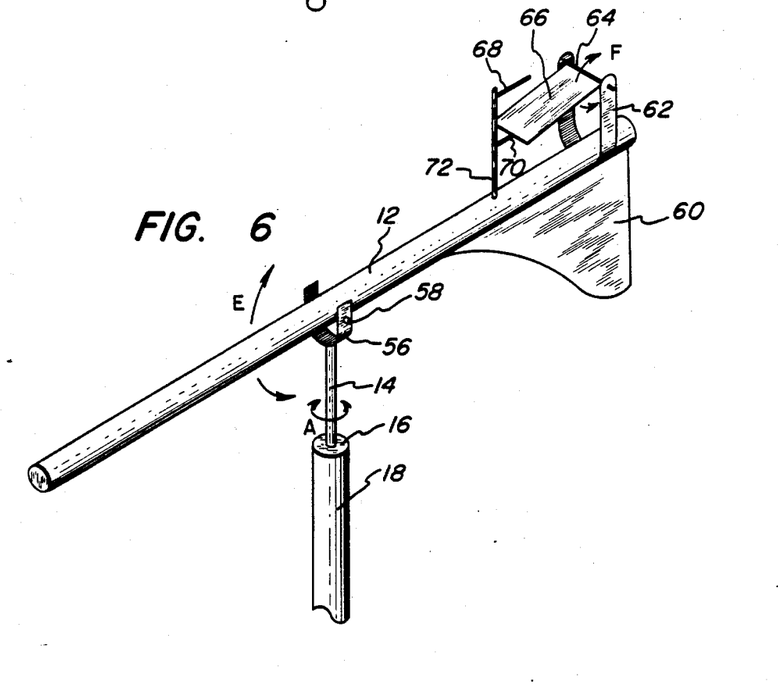
FIG. 6 is an isometric view of an embodiment of the present invention useful in measuring of wind in three dimensions.

FIG. 6 illustrates a construction of the oscillatory anemometer well suited for measuring the speed and direction of the wind in three dimensions. In this embodiment, main member 12 is not only rotatable about a vertical axis as indicated by double-headed arrow A, to align with the horizontal direction of the wind, but is also rotatable about a horizontal axis. The lower end of vertically extending shaft 14 is again journaled for free rotation within main bearing 16 on mast 18. However, this time the top end of shaft 14 is provided with a yoke 56 which mounts a horizontally oriented bearing 58 pivotally supporting main member 12. The main member is thus free to rotate about a first horizontal axis coincident with bearing 58, in the directions indicated by double-headed arrow E.

On the downwind portion of main member 12, a fixed fin 60 is mounted to insure alignment of the main member with the horizontal component of the wind. Above fixed fin 60, a support structure 62 supports a horizontally deposed bearing 64. Bearing 64 is attached to the leeward end of a fin 66 allowing the fin to rotate about the horizontal axis extending through bearing 64, as indicated by double-headed arrow F. Detents 68 and 70 extending from a support structure 72 along either side of fin 66 limit the pivotal movement of the fin and define two stable positions. The oscillatory operation of this embodiment with respect to a vertical wind component is analogous to that previously described for a horizontal component and therefore is not detailed herein.

From the foregoing it will be appreciated that a powerful new meteorological instrument capable of simultaneously, accurately measuring both variable wind speed and variable wind direction has been developed. The instrument exhibits excellent linearity of response over extended operating ranges, high sensitivity and rapid and predictable response to changes in wind speed. The oscillatory anemometer can be easily and inexpensively constructed, calibrated and operated. It can be fabricated in sizes ranging from only about one centimeter to many meters and in miniaturized form can be made as light as about one gram. Its characteristics can be tailored to meet particular requirements and its applicability is very broad.

Although several embodiments have been described and depicted in this specification, it will be readily apparent that modifications, substitutions, extensions and the like can be made by those versed in this art without departing from the spirit of the invention. For example, other known bearing arrangements or equivalent torsional or flexural suspensions, etc. may be employed, or the oscillatory anemometer may be readily adapted to generate a wind rose, or the pivotal movement of the fin may be monitored to determine the wind velocity. The scope of the invention is defined by the claims appended hereto.

The invention claimed is:

1. Apparatus for providing an indication of wind direction and wind speed, comprising:
   a main member mounted for rotation about a first axis, said main member being free to rotate about said first axis under the influence of aerodynamic forces, said first axis extending orthogonally through said main member at a first location, said main member having an upwind end, a downwind end, and a downwind portion extending between said first location and said downwind end;
   a fin mounted on said main member near said downwind end;
   fin mounting means mounting said fin for pivotal movement relative to said main member about a second axis, said second axis being substantially parallel to said first axis, said fin being free to rotate about said second axis under the influence of aerodynamic forces;
   limit means mounted on the main member for limiting the pivotal movement of said fin about the second axis and for defining two stable positions for said fin at the extremes of said limited pivotal movement;
   the apparatus being constructed such that wind pressure on the fin forces the fin into one of said stable positions and produces a lift which causes the main member to rotate about said first axis until the fin is aligned with the wind direction and the main member is in a position in which it experiences no lift; and
   wherein the main member, the fin, the fin mounting means and the limit means have a composite moment of inertia and the fin has a size sufficient to cause the main member to experience inertial overshoot and travel past said position, whereupon wind pressure forces the fin to pivot about said second axis into the other of said stable positions and produces a lift which causes the main member to rotate in a reverse direction about said first axis until the main member once more reaches a position in which it experiences no lift, overshoots, reverses rotational direction, and the process repeats itself, whereby the main member is made to oscillate about said first axis, the mean position of the oscillating main member providing an indication of wind direction and the frequency of main member oscillation providing an indication of wind speed.

2. The apparatus of claim 1 wherein the wind is variable-in-direction and the main member is free to rotate through an angle which both encompasses the possible directions of the variable-in-direction wind and allows inertial overshoot and oscillation about any of said possible directions.

3. The apparatus of claim 1 wherein the frequency of main member oscillation is linearly proportional to wind speed within the operating range of the apparatus.

4. The apparatus of claim 3 constructed such that the relationship of frequency to wind speed in said operating range is according to the following equation:

$$f = \left[\frac{0.5\rho S R a_{ve}}{I}\right]^{\frac{1}{2}} \frac{V}{2\pi}$$

wherein
  $f$ = frequency of main member oscillation
  $\rho$ = air density
  $S$ = fin area
  $R$ = distance from pivot of main member to aerodynamic center of fin
  $I$ = moment of inertia
  $V$ = wind speed
  $a_{ve}$ = effective torque parameter.

5. The apparatus of claim 1 further comprising: means for determining the mean position of the oscillating main member and providing an output therefrom indicative of wind direction; and means for determining the frequency of oscillation of the main member and providing an output therefrom indicative of wind speed.

6. The apparatus of claim 1 wherein the fin comprises a substantially planar member.

7. The apparatus of claim 1 wherein the limit means limits pivotal movement of said fin to a fin angle no greater than approximately 15 degrees.

8. The apparatus of claim 1 wherein no additional fin is mounted upwind of said first location.

9. The apparatus of claim 1 wherein the main member has an upwind portion extending between said first location and the upwind end to provide balance.

10. The apparatus of claim 1 wherein said limit means comprises detents mounted on the main member and extending along both sides of said fin.

11. The apparatus of claim 1 wherein said first and second axes are vertical axes and further comprising a vertical shaft extending along said first axis, one end of said shaft being secured to the main member at said first location, the other end of said shaft being mounted for rotation in a main bearing, and wherein said fin mounting means comprises a vertically extending bearing connected to a leeward end of the fin.

12. The apparatus of claim 1 wherein said first and second axes are horizontal axes and further comprising means for mounting said main member so that it is also rotatable about a vertical axis; and further comprising fixed fin means mounted on the downwind portion of the main member.

13. The apparatus of claim 1 wherein the limit means comprises a tether, one end of said tether being secured to the main member, the other end of the tether being secured to a windward end of the fin.

14. Apparatus for providing an indication of the current direction and speed of a fluid flow where both the direction and speed of said fluid flow are variable, comprising:
a main member mounted for free rotation about a first axis, said main member being free to rotate under the influence of said fluid flow about said first axis, said first axis extending orthogonally through said main member at a first location, said main member having an upstream end, a downstream end, and a downstream portion extending between said first location and said downstream end;
a fin mounted on said main member near said downstream end, said fin being mounted for pivotal movement under the influence of said fluid flow relative to said main member about a second axis between first and second defined stable positions, said second axis being substantially parallel to said first axis, and wherein said main member and fin are constructed such that the fin swings back and forth between said stable positions in response to fluid flow causing the main member to experience inertial overshoot and to oscillate about said first axis, the mean position of the oscillating main member providing an indication of fluid flow direction and the frequency of main member oscillation providing an indication of the speed of fluid flow.

15. The apparatus of claim 14 wherein the main member is free to rotate about said first axis through an angle which both encompasses the possible directions of said variable-in-direction fluid flow and allows inertial overshoot and oscillation about any of said possible directions without interference from any external obstruction.

16. The apparatus of claim 15 wherein the fluid comprises ambient air.

17. An oscillatory anemometer comprising:
main bearing means;
a main member supported by said main bearing means for free rotation about a first vertical axis, the main member having a generally horizontal orientation, a longitudinal axis, an upwind end, and a downwind end;
fin bearing means secured to the main member near said downwind end;
a fin mounted upon said fin bearing means for rotation about a second vertical axis;
limit means secured to the main member for limiting the rotational movement of the fin and for defining stable fin positions at two extremes of the limited rotational movement of the fin, said stable fin positions being located at equal angles on opposite sides of the longitudinal axis of the main member;
the anemometer being constructed such that wind pressure on the fin forces the fin into one of said stable positions and produces a lift which causes the main member to rotate about said first vertical axis until the fin is aligned with the wind direction and the main member is in a position in which it experiences no lift; and
wherein the size of the fin and the composite moment of inertia of the anemometer are sufficient to cause the main member to experience inertial overshoot and to travel beyond said position, whereupon wind pressure forces the fin to pivot about said second vertical axis into the other of said stable positions and produces a lift which causes the main member to rotate in a reverse direction about said first vertical axis until the main member once more reaches a position in which it experiences no lift, overshoots, reverses rotational direction and the process repeats itself, whereby the main member is made to oscillate about said first vertical axis, the mean position of the oscillating main member providing an indication of wind direction and the frequency of main member oscillation providing an indication of wind speed.

18. The anemometer of claim 17 wherein the wind direction is variable and the main member is free to rotate through an angle which both encompasses the possible directions of the variable-in-direction wind and allows inertial overshoot and oscillation about any of said possible directions.

19. The anemometer of claim 18 constructed such that the frequency of main member oscillation within the operating range of the apparatus is linearly proportional to wind speed in accordance with the following relationship:

$$f = \left[ \frac{0.5 \rho S R a_{ve}}{I} \right]^{\frac{1}{2}} \frac{V}{2\pi}$$

wherein
f = frequency of main member oscillation
$\rho$ = air density
S = fin area
R = distance from pivot of main member to aerodynamic center of fin
I = moment of inertia
V = wind speed
$a_{ve}$ = effective torque parameter.

20. The anemometer of claim 19 further comprising means for determining the mean position of the oscillating main member and providing an output therefrom indicative of wind direction; and means for determining the frequency of oscillation of the main member and providing an output therefrom indicative of wind speed.

* * * * *